United States Patent [19]

Huege et al.

[11] Patent Number: 5,620,744
[45] Date of Patent: Apr. 15, 1997

[54] METHOD OF PREVENTING CORROSION IN CONCRETE PIPE

[75] Inventors: Fred R. Huege, Colleyville; Timothy L. Salter, Fort Worth, both of Tex.

[73] Assignee: Chemical Lime Company, Fort Worth, Tex.

[21] Appl. No.: 582,968

[22] Filed: Jan. 4, 1996

[51] Int. Cl.⁶ ........................................... B05D 7/22
[52] U.S. Cl. ..................... 427/236; 427/136; 427/230; 427/419.2; 427/427
[58] Field of Search ..................... 427/236, 427, 427/136, 419.2, 230

[56] References Cited

U.S. PATENT DOCUMENTS

| | | |
|---|---|---|
| 1,106,778 | 8/1914 | Campbell . |
| 4,175,975 | 11/1979 | MacWilliams et al. ................. 106/100 |
| 4,427,643 | 1/1984 | Fowler ..................... 423/580 |
| 4,454,172 | 6/1984 | Heinrich et al. ......................... 427/236 |
| 4,464,353 | 8/1984 | Hains ..................... 423/640 |
| 4,610,801 | 9/1986 | Matthews et al. ...................... 252/181 |
| 4,627,888 | 12/1986 | Engdahl ................................ 162/30.11 |
| 4,678,685 | 7/1987 | Hasson et al. ........................... 427/235 |
| 4,717,503 | 1/1988 | Makino et al. .......................... 252/350 |
| 4,762,590 | 8/1988 | Engdahl ................................ 162/30.11 |
| 4,849,128 | 7/1989 | Timmons et al. ........................ 252/181 |
| 4,985,080 | 1/1991 | Jung ......................................... 106/672 |
| 5,051,281 | 9/1991 | Legrand et al. ......................... 427/230 |

FOREIGN PATENT DOCUMENTS 09200104  11/1994  Belgium .

OTHER PUBLICATIONS

"Sewer Crown Spray Process Cuts Corrosion," Water Environment Technology, Jan. 1995, pp. 15–16.

*Primary Examiner*—Janyce Bell
*Attorney, Agent, or Firm*—Charles D. Gunter, Jr.; Grady K. Bergen

[57] ABSTRACT

A method of treating concrete pipe is carried out by providing an aqueous lime slurry supply having a lime solids content above 35% by weight of the slurry. This is mixed within an amount of dispersing agent and may contain an alkali metal hydroxide so that the slurry has a pumpable viscosity. A spray assembly is located within the interior of the pipe. The lime slurry is pumped from this lime slurry supply through the spray assembly so that the lime slurry is applied to the interior surfaces of the pipe to neutralize acids thereon. Applying the lime spray also provides a protective coating of the lime slurry on the interior surfaces of the pipe.

37 Claims, 1 Drawing Sheet

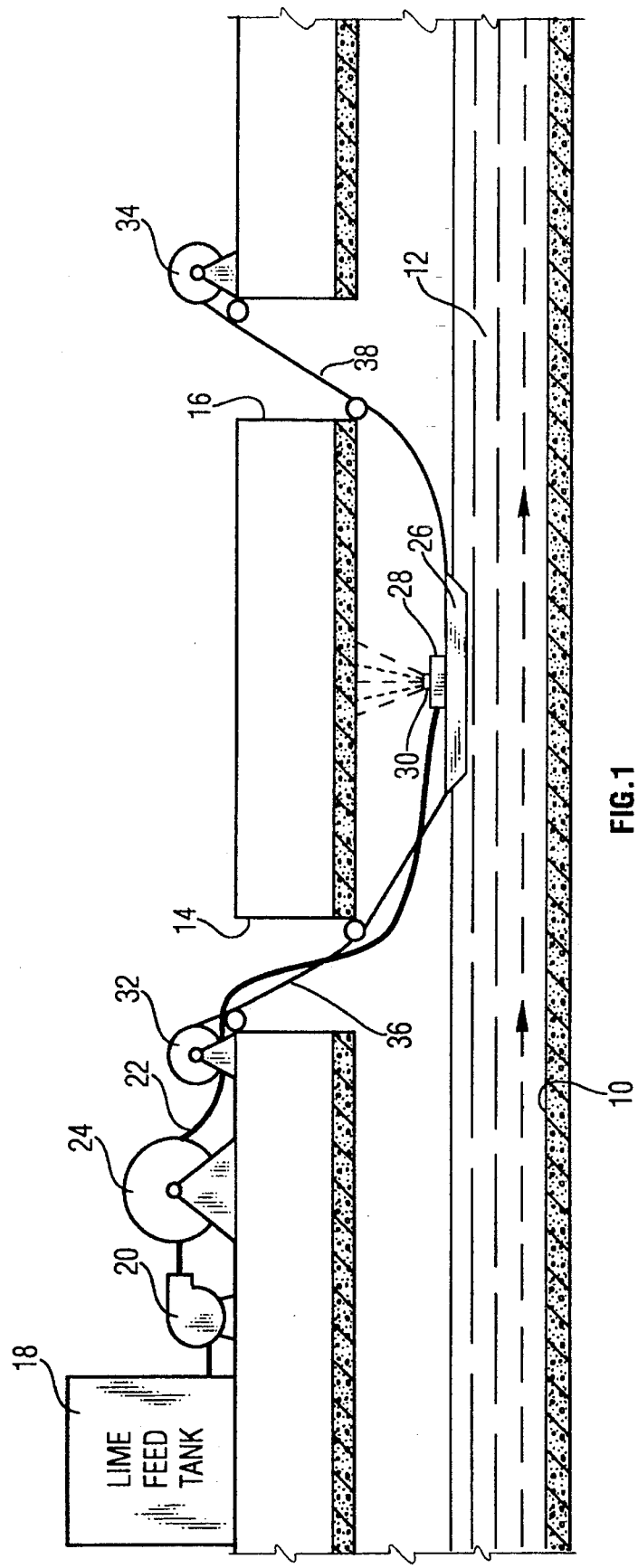

5,620,744

METHOD OF PREVENTING CORROSION IN CONCRETE PIPE

CROSS REFERENCE TO RELATED APPLICATIONS

This application is related to the copending patent application entitled "High Solids Lime as a Caustic Replacement," Ser. No. 08/519,292, filed Aug. 25, 1995.

FIELD OF THE INVENTION

This invention relates to a method of treating and protecting concrete structures, particularly concrete pipe, from acid corrosion.

DESCRIPTION OF RELATED ART

Concrete structures are susceptible to attack from various acids which react with the concrete, causing the concrete to corrode and deteriorate. This has been a particular problem in concrete sewage and drainage pipes where hundreds, even thousands, of miles of concrete pipe may be buried underground as part of the sewage system of many large towns and cities. Sulfur within the sewage or waste water reacts with bacteria that converts the sulfur to hydrogen sulfide ($H_2S$) gas. This hydrogen sulfide gas generates sulfuric acid ($H_2SO_4$) which corrodes the concrete. This damage, if left to continue, can eventually lead to the collapse of the pipe, necessitating its replacement.

Because of the many hundreds of miles of pipe that are buried underground, replacement of the concrete pipe may be impractical, if not impossible. Methods of treating the pipe to prevent or inhibit this damage, without the need for replacing the pipe, have become extremely important. These methods usually involve spraying the sides and crown of the pipe with an alkaline corrosion inhibiter. Present corrosion inhibitors include sodium hydroxide (NaOH) and magnesium hydroxide ($Mg(OH)_2$). These are applied by means of spraying equipment carried by a vessel, such as a truck or floating barge, which is moved through the interior of the pipe.

While current corrosion inhibitors eliminate or reduce the need for replacing the concrete pipe, they have many shortcomings. Sodium hydroxide is a true solution and has a relatively low viscosity. When the sodium hydroxide is applied, the solution does not adhere readily to the walls of the pipe and tends to run down the sides so that the effectiveness of the treatment is reduced. Sodium hydroxide is highly corrosive to skin, requiring safety precautions during handling. Magnesium hydroxide slurries have a lower pH and react much slower than sodium hydroxide, requiring larger amounts of magnesium hydroxide to be used. Further, both of these solutions are quite expensive.

Attempts at utilizing lime slurries to neutralize acid in the treatment of sewer pipe have not been successful. The use of slaked quicklime, which is cheaper than either sodium hydroxide or magnesium hydroxide, results in a lime slurry that is difficult to use. Conventional hydrated lime slurries may contain coarse particles, and also have lower solids and a viscosity that is difficult to control. The large particles of these lime slurries result in clogging and malfunctioning of spraying equipment.

What is needed is a method of utilizing lime in a manner that allows it to be sprayed onto the interior of a concrete pipe for neutralizing acid thereon and to protect the pipe from acid corrosion.

SUMMARY OF THE INVENTION

A method of treating a concrete structure to protect the structure from acid corrosion is accomplished by providing an aqueous lime slurry. The lime slurry has a lime solids content above 35% by weight of the slurry and includes an amount of a dispersing agent. In addition, an alkali metal hydroxide dispersing aid may be used in an amount of between 0 to 1.5% by weight of lime. The aqueous lime slurry is applied to surfaces of the concrete structure so that a protective coating of the lime slurry is formed thereon and acids are neutralized.

The method has particular application in the treatment of concrete pipe. A slurry is formed as above having a lime solids content above 35% by weight of the slurry. The slurry supply also has an amount of dispersing agent and may have an amount of between 0% to 1.5% by weight of lime of an alkali metal hydroxide so that the slurry has a pumpable viscosity. A spray assembly is located within the interior of the pipe and is provided with a spray nozzle. The lime slurry is then pumped from the slurry supply to the spray assembly so that lime slurry is sprayed through the spray nozzle and applied to exposed interior surfaces of the pipe. The lime slurry neutralizes acids and provides a protective coating on the exposed surfaces of the pipe.

BRIEF DESCRIPTION OF THE DRAWINGS

FIG. 1 is a schematic of process equipment and a cross section of concrete pipe being treated in accordance with the method of the invention.

DETAILED DESCRIPTION OF THE INVENTION

It has been found that stable, high solid content lime slurries can be formed for use in treating concrete sewage pipe to neutralize acids and to form a protective coating on the surfaces of the concrete which overcome the disadvantages of conventional lime slurries formed from either hydrated lime or quicklime. The lime slurries should have a viscosity of less than 2,000 cps and preferably less than 1,000 cps, as measured at 100 rpm on a Brookfield or Labline viscometer. These pumpable lime slurries are formed by first adding a polymer dispersing agent to the initial slurry water and then adding the required amount of lime.

The dispersants used are polymeric electrolyte dispersants, preferably anionic polyelectrolytes. Suitable anionic polyelectrolytes used as disbursing agents include polyacrylic acid, polycarboxylic acid and polyphosphoric acid, copolymers of polyacrylic acid, polycarboxylic acid and polyphosphoric acid, and the alkali metal salts thereof. Polymethacrylic acid along with the alkali metal salts thereof can also be used. Preferably, the polyacrylic acids and the polycarboxylic acid along with their alkali metal salts are used. A commercially available polyacrylate is "DISPEX N40V," available from Allied Colloids. Examples of commercially available polycarboxolate dispersants are "ACUMER 4000," "ACUMER 9000" and "ACUMER 9400," available from Rhom and Haas. The polymeric dispersing agents are preferably used in an amount of less than 3% by weight based on the dry weight of lime. Preferably, between 0.1 to 2% by weight of lime of the dispersants are used, and more preferably 0.5 to 1% are used based on the dry weight of lime.

The lime used in forming the lime slurry should have a fine particle size to ensure longer suspension of the particles. Smaller particle size also results in a better reactivity of the lime. Use of a lime slurry having a lime particle size wherein 95% of the particles are less than 20 mesh is preferred, more preferably less than 60 mesh, and still more preferably less than 100 mesh. The small particle size allows the slurry to be more easily pumped to avoid clogging and plugging of the equipment and spray nozzles. Both normal (Type N) and hydrated dolomitic lime (Type S) are suitable for forming lime slurries in treating concrete sewer pipe. The lime is used in an amount between about 35% to 55% by weight of the slurry.

A dispersing aid of an alkali metal hydroxide may be used to further lower the viscosity of the slurry without requiring additional polymer dispersant. Preferably, the alkali metal hydroxide dispersing aid is added after the dispersing agent and the lime have already been mixed. This order of addition has been found to be extremely important, as it reduces the viscosity of the lime slurry even further than if the dispersing aid is added prior to the dispersant. Suitable alkali metal hydroxide dispersing aids include sodium hydroxide, potassium hydroxide and lithium hydroxide. Sodium hydroxide, however, is preferred as it is readily available. The amount of sodium hydroxide may range anywhere between about 0.1% to 1.5% by weight of lime. Preferably, between 0.3% to 0.8% of sodium hydroxide by weight of lime is used.

In addition to the above, other compounds may be added. A suspending agent such as bentonite, synthetic hectorite or a high molecular weight organic suspending agent may sometimes be beneficial. Typically, the suspending agents are used in the amount of less than 1% by weight of lime. The addition of biocides to the slurry may also improve the slurry's effectiveness in destroying bacteria which facilitate the formation of sulfuric acid.

Examples of suitable lime treatment slurries are given below in Table 1. Viscosities were determined with the use of either a Brookfield or Labline viscometer at 100 rpm for a 47% solids lime slurry. In each case the sodium hydroxide dispersing aid was added last. In all examples, the lime used had a particle size wherein 95% of the particles were finer than 20 mesh.

TABLE 1

| Example | Water | Ca(OH)$_2$ | Dispersant | NaOH | Viscosity |
|---|---|---|---|---|---|
| 1 | 325 g | 325 g | 3.25 g Acumer 9400 | 2.6 g | 279 cps |
| 2 | 325 g | 345 g | 4.31 g Acumer 9400 | 3.9 g | 58 cps |
| 3 | 345 g | 325 g | 1.62 g Acumer 9400 | 1.3 g | 1179 cps |
| 4 | 325 g | 325 g | 6.5 g Dispex N40V | 2.6 g | 70 cps |
| 5 | 300 g | 325 g | 6.5 g Acumer 9400 | 4.8 g | 18 cps |

The lime slurries produced as above have a high pH which makes them desirable for the neutralization of acids when treating concrete pipe. Typically, lime slurries produced in this manner have a pH of approximately 12.4. These lime slurries are also characterized by excellent thixotropic properties, wherein the slurry exhibits a shear-thinning behavior when pumped, but thickens after it is applied. This is beneficial as the slurry tends to adhere to the walls of the pipe after it is applied to ensure complete neutralization of acids thereon and to form a protective coating.

The characteristics of the lime treatment slurries can be seen more clearly when contrasted with conventional lime slurries. Table 2 sets out the various properties of a slurry for use in treating concrete pipe and a conventional slaked lime slurry. Viscosities were determined with a Brookfield DV-I+ viscometer. The shear-thinning behavior of the treatment slurry is seen by the lower viscosity at 100 rpm compared to the 20 rpm viscosity. A known amount of each slurry was passed over a 100 mesh screen and the portion retained on the screen was dried and weighed. The amount retained on the screen is reported as a percentage of the original solid portion. The solid content in each slurry was determined by the Gardner cup method in which the density of a known amount of slurry is measured and the result converted into percentage solid content.

TABLE 2

|  | CRS 45 Crown Capping Slurry | Normal Slurry-Slaked Lime |
|---|---|---|
| Slurry Characteristics |  |  |
| Viscosity @ 20 rpm | 90 cps | 972 cps |
| Viscosity cps @ 100 rpm | 37 cps | 275 cps |
| % Retained on 100 mesh screen | 0.85% | 11.6% |
| % Solids Content | 44.9% | 37.9% |
| Formulation (quantities in grams) |  |  |
| Quicklime | 0 | 1000 |
| Hydrated Lime | 1200 | 0 |
| Gypsum | 0 | 12.0 |
| Rohm and Haas Acumer 9400 | 12.0 | 0 |
| NaOH | 11.7 | 0 |
| Water | 1467 | 2420 |

Referring to FIG. 1, an underground concrete sewer pipe 10 used for transporting waste water 12 is shown. Passages 14, 16 are provided for accessing the interior of the pipe 10 from the surface. At the surface, a lime supply stored in a lime feed tank 18 is positioned nearby and connected to a feed pump 20 to pump the treatment slurry through a hose 22, which is stored on a hose supply reel 24.

A vessel 26, which may be in the form of a floating barge, is located within the interior of the concrete pipe 10 and is moved along the length of the pipe 10 as it is carried on the surface of the waste water 12. The vessel 26 may also be a truck or wheeled vehicle in situations where the pipe is large enough and there is not enough waste water to carry a floating vessel.

Lime slurry is supplied to the vessel 28 by the hose 22. The hose 22 extends from the feed pump 20 through one of the passages 14, 16, and into the interior of the pipe 10. The hose 22 is attached to a spray assembly 28 mounted on the vessel 26. The spray assembly 28 is provided with a spray nozzle or nozzles 30 oriented so that the treatment slurry is directed along the crown and sides of the pipe interior.

Located at the surface, adjacent to the passages 14, 16 are winches 32, 34, respectively. To move the vessel 26 within the interior of the pipe 10, cables 36, 38 carried by the winches 32, 34, respectively, are passed through the passages 14, 16 and connected to opposite ends of the vessel 26 located within the pipe interior. As viewed in FIG. 1, the winch 32 carrying cable 36 is an upstream winch, and the winch 34 carrying cable 38 is a downstream winch. By feeding and taking up cable with the winches 32, 34 the float 26 can be moved along the length of the sewer pipe 10 between the passages 14, 16.

As the vessel 26 is passed through the interior of the concrete pipe 10, the pump 20 delivers a continuous supply of the lime treatment slurry from the feed tank 18 through the hose 22 to the spray assembly 28 and spray nozzles 30.

The hose 22 is fed or taken up on the supply reel 24 as the vessel 26 is moved within the pipe 10. The amount of lime slurry applied to the surfaces of the pipe 10 is controlled by the capacity of the pump 20 and spray nozzles 30 and the rate at which the vessel 26 is drawn down the length of the pipe 10.

In a typical treatment of a conventional 10 foot diameter concrete pipe, approximately one gallon of lime treatment slurry may be applied per foot of pipe. It should be apparent, however, that varying amounts of treatment slurry may be used depending upon the particular conditions encountered, such as the amount of acid to be neutralized and the size of the pipe. It also should be noted that the viscosity of the lime slurry can be adjusted to suit the type of equipment used by varying the amounts of dispersing agent or sodium hydroxide dispersing aid used.

The method of treating concrete sewer pipe as described has many advantages over the prior art. The lime slurry is inexpensive in comparison to the magnesium hydroxide and sodium hydroxide solutions presently used. Due to the treatment slurry's thixotropic properties, the lime slurry is thin during pumping, but becomes thick after it is applied. Thus, the slurry does not run or drip but adheres readily to the walls of the pipe. Both magnesium hydroxide slurries and sodium hydroxide solutions are thin and tend to run down the walls of the pipe after application. The lime treatment slurry is also much safer to handle than sodium hydroxide solutions, and because the treatment slurry has a higher pH (about 12) than magnesium hydroxide, which has a pH of about 10, the treatment slurry is more effective in killing or retarding the growth of the pathogenic bacteria that lead to the formation of sulfuric acid.

Another important advantage of the lime treatment slurry is that the calcium hydroxide reacts with sulfuric acid to form an insoluble coating on the walls of the treated pipe. The reaction is characterized as follows:

$$Ca(OH)_2 + H_2SO_4 \rightarrow CaSO_4 \cdot 2H_2O \qquad \text{(Eq. 1)}$$

The product produced, gypsum, is a slightly soluble salt which tends to adhere to and fill in the pores of the concrete to thus provide a protective coating, further preventing or reducing acid corrosion. When either magnesium hydroxide or sodium hydroxide are used, the product produced during the neutralization of acid is a soluble salt, i.e., magnesium sulfate ($MgSO_4$) or sodium sulfate ($NaSO_4$). Both these salts tend to readily dissolve and fall away from the walls of the treated pipe.

Because the treatment slurry has a fine particle size and a low viscosity when pumped, it is usable where conventional lime slurries cannot be. In conventional lime slurries, the slurries are characterized by a high viscosity and large particle size, with the solids tending to quickly settle out of suspension. The conventional lime slurries also have a lower solids content, usually less than 35%, requiring more of the slurry to be used for acid neutralization.

While the invention has been shown in only one of its forms, it should be apparent to those skilled in the art that it is not so limited but susceptible to various changes without departing from the scope of the invention.

We claim:

1. A method of treating a concrete structure to protect the structure from acid corrosion comprising:

providing an aqueous lime slurry having a lime solids content above 35% by weight of the slurry; and applying the aqueous lime slurry to surfaces of the concrete structure so that a protective coating of the time slurry is formed thereon.

2. The method of claim 1, wherein:

at least 95% of the lime has a particle size finer than about 20 mesh.

3. The method of claim 1, wherein:

at least 95% of the lime has a particle size finer than about 60 mesh.

4. The method of claim 1, wherein:

the aqueous lime slurry further contains an alkali metal hydroxide in an amount of between about 0% to 1.5% by weight of lime.

5. The method of claim 5, wherein:

the alkali metal hydroxide is added to the slurry after the lime and dispersing agent.

6. The method of claim 4, wherein:

the alkali metal hydroxide is selected from a group consisting of sodium hydroxide, lithium hydroxide and potassium hydroxide.

7. The method of claim 1, wherein:

the slurry has a viscosity of less than 2000 cps as measured at 100 rpm on a Brookfield Viscometer.

8. The method of claim 1, wherein:

the lime slurry has a pH of about 12.

9. The method of claim 4, wherein:

the lime solids content is between about 35 to 55% by weight of the slurry.

10. The method of claim 1, further comprising:

providing an amount of a dispersing agent with the aqueous lime slurry.

11. The method of claim 10, wherein:

the amount of the dispersing agent is between about 0.1 to 3% by weight of lime.

12. The method of claim 10, wherein:

the dispersing agent is an anionic polyelectrolyte.

13. The method of claim 10, wherein:

the dispersing agent is selected from a group consisting of a polyacrylic acid, polycarboxylic acid and polyphosphoric acid, copolymers of polyacrylic acid, polycarboxylic acid and polyphosphoric acid, and alkali metal salts thereof.

14. A method of treating a concrete pipe having a pipe interior to protect exposed surfaces of the pipe interior from acid corrosion, the method comprising:

providing an aqueous lime slurry supply having a lime solids content above 35% by weight of the slurry, an amount of a dispersing agent and an alkali metal hydroxide in an amount of at least 0.1% by weight of lime so that the slurry has a pumpable viscosity;

locating a spray assembly having a spray nozzle within the interior of the pipe; and pumping the lime slurry from the lime slurry supply to the spray assembly as the spray assembly is moved within the pipe interior so that the lime slurry is sprayed through the spray nozzle and applied to the exposed surfaces of the pipe, and wherein a protective coating of the lime slurry is formed on the exposed surfaces of the pipe interior.

15. The method of claim 14, wherein:

at least 95% of the lime has a particle size finer than about 20 mesh.

16. The method of claim 14, wherein:

at least 95% of the lime has a particle size finer than about 60 mesh.

17. The method of claim 14, wherein:

the amount of the dispersing agent is between about 0.1 to 3% by weight of lime.

18. The method of claim 14, wherein:

the amount of alkali metal hydroxide is between about 0.1 to 1.5% by weight of lime.

19. The method of claim 14, wherein:

the alkali metal hydroxide is added to the slurry after the lime and dispersing agent.

20. The method of claim 14, wherein:

the slurry has a viscosity of less than 2000 cps as measured at 100 rpm on a Brookfield Viscometer.

21. The method of claim 14, wherein:

the lime slurry has a pH of about 12.

22. The method of claim 14, wherein:

the lime solids content is between about 35 to 55% by weight of the slurry.

23. The method of claim 14, wherein:

the alkali metal hydroxide is selected from a group consisting of sodium hydroxide, lithium hydroxide and potassium hydroxide.

24. The method of claim 14, wherein:

the dispersing agent is an anionic polyelectrolyte.

25. The method of claim 14, wherein:

the dispersing agent is selected from a group consisting of a polyacrylic acid, polycarboxylic acid and polyphosphoric acid, copolymers of polyacrylic acid, polycarboxylic acid and polyphosphoric acid, and alkali metal salts thereof.

26. A method of treating concrete sewer pipe having a pipe interior to protect exposed surfaces of the pipe interior from acid corrosion, the method comprising:

providing an aqueous lime slurry supply formed by first mixing together water, lime solids in an amount between about 35% to 55% by weight of the slurry, and an amount of a dispersing agent so that the slurry has a viscosity of less than 2000 cps as measured at 100 rpm on a Brookfield Viscometer, and wherein at least 95% of the lime has a particle size finer than about 20 mesh;

passing a spray assembly having a spray nozzle through the interior of the pipe; and pumping the lime slurry from the lime slurry supply to the spray assembly as the spray assembly is passed through the interior of the pipe so that the lime slurry is sprayed through the spray nozzle and applied to the exposed interior surfaces of the pipe along the pipe's length, and wherein a protective coming of the lime slurry is formed on the exposed interior surfaces of the pipe.

27. The method of claim 26, wherein:

at least 95% of the lime has a particle size finer than about 60 mesh.

28. The method of claim 26, wherein:

the amount of the dispersing agent is between about 0.1 to 3% by weight of lime.

29. The method of claim 26, wherein:

the aqueous lime slurry further contains an alkali metal hydroxide in an amount of between about 0% to 1.5% by weight of lime.

30. The method of claim 29, wherein:

the alkali metal hydroxide is selected from a group consisting of sodium hydroxide, lithium hydroxide and potassium hydroxide.

31. The method of claim 29, wherein:

the amount of alkali metal hydroxide is between about 0.3 to 1.5% by weight of lime.

32. The method of claim 26, wherein:

the lime slurry has a pH of about 12.

33. The method of claim 26, wherein:

the dispersing agent is an anionic polyelectrolyte.

34. The method of claim 26, wherein:

the dispersing agent is selected from a group consisting of a polyacrylic acid, polycarboxylic acid and polyphosphoric acid, copolymers of polyacrylic acid, polycarboxylic acid and polyphosphoric acid, and alkali metal salts thereof.

35. A method of treating a concrete structure to protect the structure from acid corrosion comprising:

providing an aqueous lime slurry having a lime solids content above 35% by weight of the slurry, and a polymeric electrolyte dispersing agent; and applying the aqueous lime slurry to surfaces of the concrete structure so that a protective coating of the time slurry is formed thereon.

36. A method of treating a concrete pipe having a pipe interior to protect exposed surfaces of the pipe interior from acid corrosion, the method comprising:

providing an aqueous lime slurry supply having a lime solids content above 35% by weight of the slurry, an amount of a polymeric electrolyte dispersing agent and an alkali metal hydroxide in an amount of at least 0.1% by weight of lime so that the slurry has a pumpable viscosity;

locating a spray assembly having a spray nozzle within the interior of the pipe; and pumping the lime slurry from the lime slurry supply to the spray assembly as the spray assembly is moved within the pipe interior so that the lime slurry is sprayed through the spray nozzle and applied to the exposed surfaces of the pipe, and wherein a protective coating of the lime slurry is formed on the exposed surfaces of the pipe interior.

37. A method of treating concrete sewer pipe having a pipe interior to protect exposed surfaces of the pipe interior from acid corrosion, the method comprising:

providing an aqueous lime slurry supply formed by first mixing together water, lime solids in an amount between about 35% to 55% by weight of the slurry, and an amount of a polymeric electrolyte dispersing agent so that the slurry has a viscosity of less than 2000 cps as measured at 100 rpm on a Brookfield Viscometer, and wherein at least 95% of the lime has a particle size finer than about 20 mesh;

passing a spray assembly having a spray nozzle through the interior of the pipe; and pumping the lime slurry from the lime slurry supply to the spray assembly as the spray assembly is passed through the interior of the pipe so that the lime slurry is sprayed through the spray nozzle and applied to the exposed interior surfaces of the pipe along the pipe's length, and wherein a protective coating of the lime slurry is formed on the exposed interior surfaces of the pipe.

* * * * *